(12) United States Patent
Imanishi

(10) Patent No.: US 10,294,845 B2
(45) Date of Patent: May 21, 2019

(54) SYSTEM AND METHOD FOR MANAGING TEMPERATURE OF UREA SOLUTION

(71) Applicant: ISUZU MOTORS LIMITED, Tokyo (JP)

(72) Inventor: Minehiro Imanishi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 102 days.

(21) Appl. No.: 15/502,618

(22) PCT Filed: Aug. 3, 2015

(86) PCT No.: PCT/JP2015/071928
§ 371 (c)(1),
(2) Date: Feb. 8, 2017

(87) PCT Pub. No.: WO2016/021537
PCT Pub. Date: Feb. 11, 2016

(65) Prior Publication Data
US 2017/0248057 A1    Aug. 31, 2017

(30) Foreign Application Priority Data

Aug. 8, 2014 (JP) .................................. 2014-162712

(51) Int. Cl.
*F01N 9/00* (2006.01)
*F01N 3/28* (2006.01)
*F01N 3/20* (2006.01)

(52) U.S. Cl.
CPC ............ *F01N 9/00* (2013.01); *F01N 3/2066* (2013.01); *F01N 3/2896* (2013.01);
(Continued)

(58) Field of Classification Search
CPC .......................... F01P 2060/00; F01N 3/2066
See application file for complete search history.

(56) References Cited

U.S. PATENT DOCUMENTS 9,816,758 B2 * 11/2017 Gismervik ............ F01N 3/2066
2005/0217260 A1 * 10/2005 Desjardins .............. F16D 31/02
60/421

(Continued)

FOREIGN PATENT DOCUMENTS

CN       101052790 A      10/2007
CN       101828011 A       9/2010
(Continued)

OTHER PUBLICATIONS

International Search Report and Written Opinion for PCT App No. PCT/JP2015/071928 dated Sep. 8, 2015, 9 pgs.
(Continued)

*Primary Examiner* — Patrick D Maines
(74) *Attorney, Agent, or Firm* — Procopio, Cory, Hargreaves & Savitch LLP

(57) ABSTRACT

A system and method for managing the temperature of a urea solution are thereby provided, in which air bubble formation in the urea solution caused by increases in the urea solution temperature is suppressed while thawing of the urea solution stored in the urea solution tank and used for NOx purification treatment is ensured, the concentration of the urea contained in the urea solution is accurately determined, and NOx is precisely reduced.

3 Claims, 2 Drawing Sheets

(52) U.S. Cl.
CPC ...... *F01N 2570/14* (2013.01); *F01N 2610/02* (2013.01); *F01N 2610/10* (2013.01); *F01N 2610/105* (2013.01); *F01N 2900/1811* (2013.01); *Y02T 10/24* (2013.01); *Y02T 10/47* (2013.01)

(56) References Cited

U.S. PATENT DOCUMENTS

| | | |
|---|---|---|
| 2007/0180816 A1 | 8/2007 | Masuda et al. |
| 2007/0199308 A1 | 8/2007 | Satou et al. |
| 2007/0251226 A1 | 11/2007 | Kaneko |
| 2008/0092531 A1 | 4/2008 | Suzuki et al. |
| 2009/0104085 A1* | 4/2009 | Ichikawa ............... F01N 3/208 422/112 |
| 2009/0301068 A1* | 12/2009 | Fujita ................... F01N 3/208 60/286 |
| 2010/0242439 A1 | 9/2010 | Domon et al. |
| 2013/0061574 A1 | 3/2013 | Minezawa et al. |
| 2013/0061949 A1 | 3/2013 | Minezawa et al. |
| 2013/0118155 A1 | 5/2013 | Domon et al. |
| 2014/0227137 A1 | 8/2014 | Iida et al. |
| 2014/0331647 A1* | 11/2014 | Liljestrand ............. F01N 3/208 60/274 |
| 2016/0032804 A1* | 2/2016 | Liljestrand ............. F01N 3/208 60/274 |

FOREIGN PATENT DOCUMENTS

| | | |
|---|---|---|
| CN | 102947562 A | 2/2013 |
| CN | 103842629 A | 6/2014 |
| EP | 1806487 A1 | 7/2007 |
| JP | 2005-090431 A | 4/2005 |
| JP | 2005-315206 A | 11/2005 |
| JP | 2008-101535 A | 5/2008 |
| JP | 2013-217233 A | 10/2013 |

OTHER PUBLICATIONS

Extended European Search Report for related European application No. 15829040.3 dated Jan. 8, 2018, 8 pages.
First Office Action for related CN App No. 201580042033.5 dated Jul. 23, 2018, 9 pgs.

\* cited by examiner

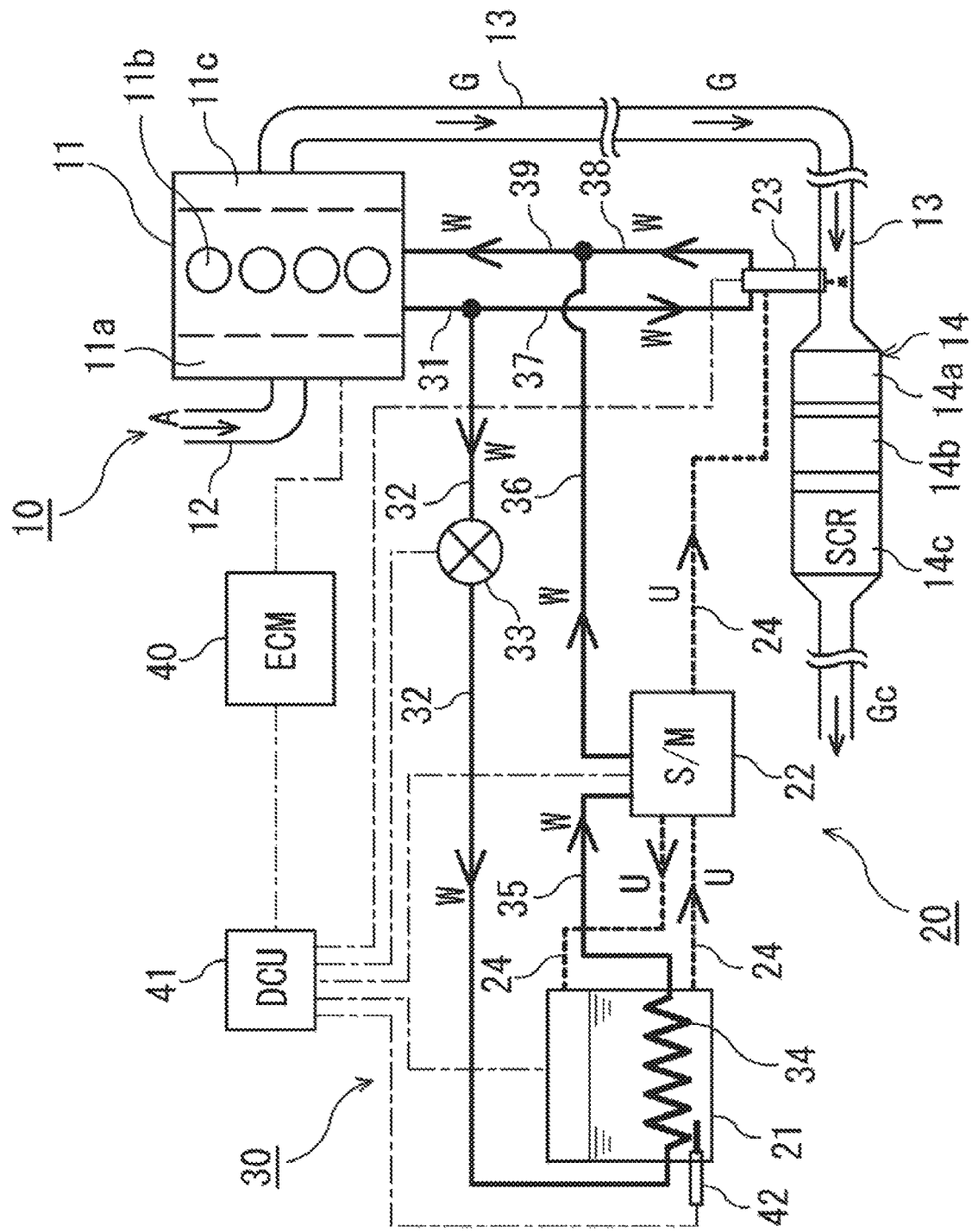
[FIG.1]

[FIG.2]
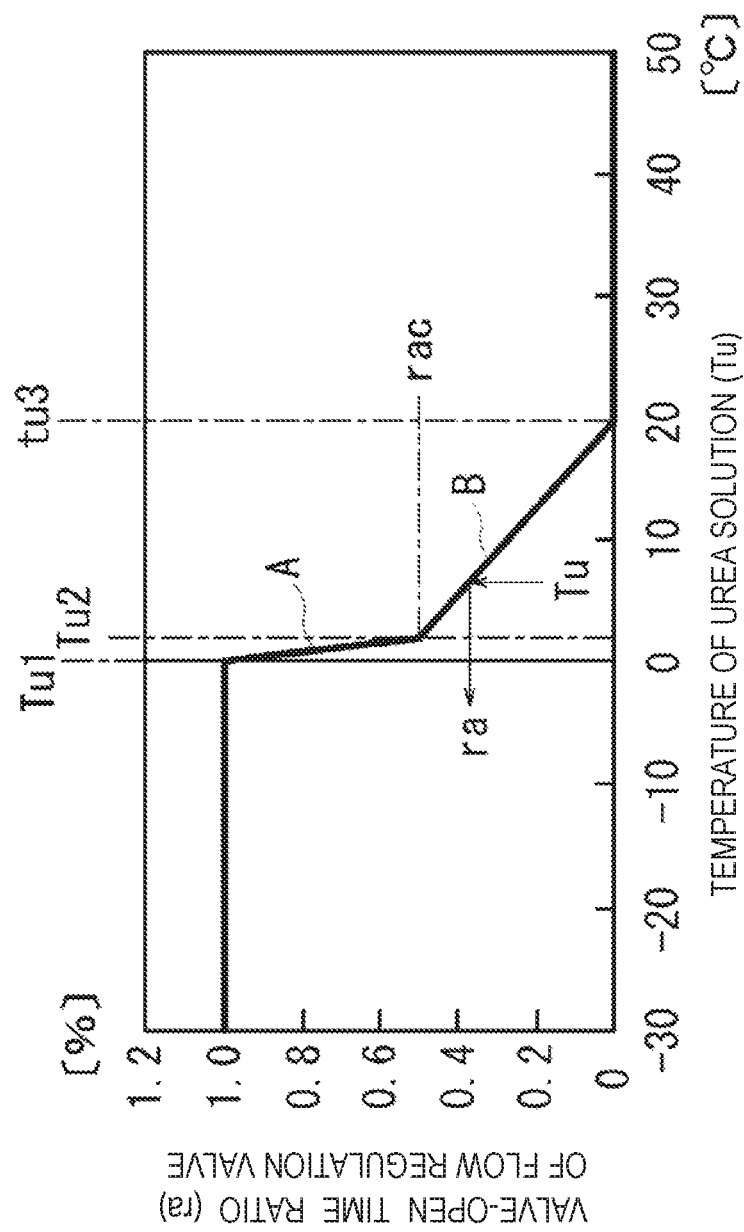

SYSTEM AND METHOD FOR MANAGING TEMPERATURE OF UREA SOLUTION

CROSS-REFERENCE TO RELATED APPLICATIONS

This application is a U.S. National Stage entry of PCT Application No. PCT/JP2015/071928, filed on Aug. 3, 2015, which claims priority to Japanese Patent Application No. 2014-162712, filed Aug. 8, 2014, the contents of which are incorporated herein by reference.

TECHNICAL FIELD

The present invention relates to a system and method for managing a temperature of a urea solution for thawing or keeping warm a urea solution that is stored in a urea solution tank and is used as a reducing agent for NOx purification treatment in an exhaust gas of an internal combustion engine.

BACKGROUND ART

In general, a vehicle having an internal combustion engine such as a Diesel engine mounted thereon is provided with an exhaust gas purification device configured by a combination of an oxidation catalytic device, a particulate trap device, a lean NOx trap catalytic device, a selective reduction-type catalytic (SCR catalytic) device and the like so as to remove PM (particulate matters), NOx (nitrogen oxide), HC (hydrocarbon) and the like included in an exhaust gas that is to be discharged from the internal combustion engine.

The selective reduction-type catalytic device is configured to perform purification treatment by injecting a urea solution to the exhaust gas from a urea solution injection device provided upstream of the selective reduction-type catalytic device, generating $NH_3$ (ammonia) from the urea solution in the exhaust gas and reducing NOx included in the exhaust gas with $NH_3$.

A melting point of the urea solution is different depending on a concentration of urea but is about $-11°$ C. to $0°$ C. (urea 0%). In a cold region and the like, when a temperature of the urea solution stored in a urea solution tank becomes equal to or lower than the melting point and the urea solution is thus solidified and frozen, it is difficult to supply the urea solution to the urea solution injection device. Regarding this, for example, as disclosed in a Japanese Unexamined Patent Application Publication No. 2013-217233, the stored urea solution is thawed and the temperature thereof is kept by using engine cooling water or the like.

When starting the NOx treatment in the exhaust gas, it is necessary to rapidly supply the urea solution to the selective reduction-type catalytic device. Therefore, when starting the supply of the urea solution, the urea solution should be at a thawed state. Also, since it is necessary to supply the urea solution to the selective reduction-type catalytic device in an amount corresponding to an amount of NOx in the exhaust gas, a concentration of a urea amount in the urea solution is determined.

In the related art, the flowing of the engine cooling water to warm the urea solution is controlled by opening and closing control of an opening and closing valve on a line of the engine cooling water. However, when an opening timing of the opening and closing valve is slow or a closing timing of the opening and closing valve is fast, the thawing of the urea solution is delayed or insufficient, so that it is not possible to supply the urea solution when the NOx treatment is required. Also, when the closing timing of the opening and closing valve is slow, air bubbles are formed in the urea solution due to an increase in a temperature of the urea solution, so that it is not possible to accurately determine the concentration of urea in the urea solution and to supply a proper amount of the urea solution, which causes a problem in the purification treatment of NOx in the exhaust gas by the exhaust gas purification device.

CITATION LIST

Patent Literature

PTL 1: Japanese Unexamined Patent Application Publication No. 2013-217233

SUMMARY OF INVENTION

Technical Problem

The present invention has been made in view of the above situations, and an object thereof is to provide a system and method for managing a temperature of a urea solution capable of suppressing air bubble formation in a urea solution caused due to an increase in a temperature of a urea solution while securing a thawing property of the urea solution stored in a urea solution tank and used as a reducing agent for NOx purification treatment in an exhaust gas of an internal combustion engine, accurately determining a concentration of urea included in the urea solution, and precisely reducing NOx.

Solution to Problem

In order to achieve the above object, according to the present invention, there is provided a system for managing a temperature of a urea solution configured to thaw or keep warm a urea solution stored in a urea solution tank by flowing a heating medium to pass through the urea solution tank, which is configured to store therein the urea solution to be used as a reducing agent for NOx purification treatment in an exhaust gas of an internal combustion engine, wherein a control device is configured to control a flow control valve that is configured to regulate a flow rate of the heating medium to be supplied to the urea solution tank, the control device being configured to perform control of: setting a valve-open time ratio of the flow control valve to 100% so as to make the flow control valve continuously open when a temperature of the urea solution in the urea solution tank is equal to or lower than a preset first temperature; setting the valve-open time ratio of the flow control valve to a preset set ratio when the temperature of the urea solution in the urea solution tank is a preset second temperature; setting the valve-open time ratio of the flow control valve to 0% so as to make the flow control valve continuously close when the temperature of the urea solution in the urea solution tank is equal to or higher than a preset third temperature; setting the valve-open time ratio of the flow control valve to a linearly interpolated time ratio between 100% and the set ratio when the temperature of the urea solution in the urea solution tank is between the first temperature and the second temperature; and setting the valve-open time ratio of the flow control valve to a linearly interpolated time ratio between the set ratio and 0% when the temperature of the urea solution in the urea solution tank is between the second temperature and the third temperature.

According to the above configuration, it is possible to suppress air bubble formation in the urea solution caused due to an increase in the temperature of the urea solution while securing a thawing property of the urea solution in the urea solution tank by flow regulation of the heating medium such as engine cooling water, and to accurately determine a concentration of urea (quality) included in the urea solution.

Also, in the system for managing a temperature of a urea solution, the heating medium is engine cooling water, and when the first temperature is set to be within a temperature range of −11° C. to 0° C., the second temperature is set to be within a temperature range of 1° C. to 2.5° C., the third temperature is set to be within a temperature range of 15° C. to 20° C. and the set ratio is set to be within a range of 40% to 60%, it is possible to more effectively manage a temperature state of the urea solution to a state where the urea solution is thawed and the urea concentration can be precisely determined.

In order to achieve the above object, there is provided a method for managing a temperature of a urea solution, the method comprising: thawing or keeping warm a urea solution stored in a urea solution tank by flowing a heating medium to pass through the urea solution tank, the urea solution tank storing the urea solution to be used as a reducing agent for NOx purification treatment in an exhaust gas of an internal combustion engine; and regulating a flow rate of the heating medium to be supplied to the urea solution tank by a flow control valve, wherein the method comprises performing control of: setting a valve-open time ratio of the flow control valve to 100% so as to make the flow control valve continuously open when a temperature of the urea solution in the urea solution tank is equal to or lower than a preset first temperature; setting the valve-open time ratio of the flow control valve to a preset set ratio when the temperature of the urea solution in the urea solution tank is a preset second temperature; setting the valve-open time ratio of the flow control valve to 0% so as to make the flow control valve continuously close when the temperature of the urea solution in the urea solution tank is equal to or higher than a preset third temperature; setting the valve-open time ratio of the flow control valve to a linearly interpolated time ratio between 100% and the set ratio when the temperature of the urea solution in the urea solution tank is between the first temperature and the second temperature; and setting the valve-open time ratio of the flow control valve to a linearly interpolated time ratio between the set ratio and 0% when the temperature of the urea solution in the urea solution tank is between the second temperature and the third temperature.

Also, in the method for a temperature of a urea solution, the heating medium is engine cooling water, and the first temperature is set to be within a temperature range of −11° C. to 0° C., the second temperature is set to be within a temperature range of 1° C. to 2.5° C., the third temperature is set to be within a temperature range of 15° C. to 20° C. and the set ratio is set to be within a range of 40% to 60%.

According to the above method, it is possible to achieve the same effects as the system for managing a temperature of a urea solution.

Advantageous Effects of Invention

According to the system and method for managing a temperature of a urea solution of the present invention, the flow regulation of the heating medium such as engine cooling water is performed by the opening and closing control of the relatively simple opening and closing valve. Thereby, it is possible to suppress the air bubble formation in the urea solution caused due to an increase in the temperature of the urea solution while securing the thawing property of the urea solution stored in the urea solution tank and used as a reducing agent for NOx purification treatment in the exhaust gas of the internal combustion engine, to accurately determine the concentration of urea (quality) included in the urea solution and to reduce NOx by precisely supplying a proper amount of the urea solution.

BRIEF DESCRIPTION OF DRAWINGS

FIG. 1 depicts an example of a configuration of a system for managing a temperature of a urea solution in accordance with an illustrative embodiment of the present invention, FIG. 2 depicts a relation between a temperature of a stored urea solution and a valve-open time ratio of a flow control valve, in a method for managing a temperature of a urea solution in accordance with an illustrative embodiment of the present invention.

DESCRIPTION OF EMBODIMENTS

Hereinafter, a system and method for managing a temperature of a urea solution in accordance with an illustrative embodiment of the present invention will be described with reference to the drawings.

First, an engine (internal combustion engine) 10 having a system 30 for managing a temperature of a urea solution in accordance with an illustrative embodiment of the present invention is described with reference to FIG. 1. In an engine main body 11 of the engine 10, an intake air A introduced into an intake manifold 11a from an intake passage 12 is combusted together with fuel in a cylinder 11b, an exhaust gas G after the combustion is discharged from an exhaust manifold 11c to an exhaust passage 13 and is purification-treated by an exhaust gas purification device 14 disposed on the exhaust passage 13, and the purification-treated exhaust gas Gc is discharged to the atmosphere through a muffler (not shown).

The exhaust gas purification device 14 includes an oxidation catalyst 14a, a filter 14b for PM trap, and a urea selective reduction-type catalytic (urea SCR catalytic) device 14c. A urea solution injection device 23 is provided upstream of the exhaust gas purification device 14. From the urea solution injection device 23, a urea solution U is injected to the exhaust gas G, so that $NH_3$ (ammonia) is generated from the urea solution U in the exhaust gas G. $NH_3$ is supplied to the urea selective reduction-type catalytic device 14c in the exhaust gas purification device 14, so that NOx included in the exhaust gas G is reduced by $NH_3$ and purification treatment is thus performed. The urea selective reduction-type catalytic device 14c is generally formed by supporting noble metal catalyst such as platinum, vanadium or the like or vanadium, copper or non-metal catalyst on a honeycomb structure.

A urea solution supply system 20 configured to supply the urea solution U from the urea solution injection device 23 to the exhaust passage 13 and to the exhaust gas G therein includes a urea solution tank 21 configured to store therein the urea solution U, a urea solution supply device (supply module: S/M) configured to pressurize the urea solution U to a high pressure of about 9 bar and to supply the pressurized urea solution U to the urea solution injection device 23, the urea solution injection device 23 and a urea solution piping 24 (shown with a dotted line) configured to connect the constitutional elements. The urea solution supply device 22 is configured to pressurize and supply the urea solution U to the urea solution injection device 23 upon the supply of the urea solution U and also has a function of sucking and returning a surplus urea solution U, which is to remain in the urea solution injection device 23 without being injected, after the injection of the urea solution U.

Also, a melting point of the urea solution U is about −11° C. to 0° C. In a cold region and the like, when a temperature of the urea solution U stored in the urea solution tank 21 becomes equal to or lower than the melting point and the urea solution is thus solidified and frozen, it is difficult to supply the urea solution U to the urea solution injection device 23. Therefore, the urea solution supply system 20 is provided with the system 30 for managing a temperature of a urea solution configured to thaw the urea solution U or to keep a temperature of the urea solution U at the melting point or higher by circulating the engine cooling water W through a heating pipe 34 of the urea solution tank 21 and the urea solution injection device 23.

The system 30 for managing a temperature of a urea solution includes a first piping 31 extending from the engine main body 11, a second piping 32 branching from the first piping 31, a flow control valve 33 provided for the second piping 32, the heating pipe 34 provided for the urea solution tank 21, a third piping 35 configured to interconnect the heating pipe 34 and the urea solution supply device 22, a fourth piping 36 extending from the urea solution supply device 22 towards the engine main body 11, a fifth piping 39 to which the fourth piping 36 joins, a sixth piping 37 branching from the first piping 31, connected to the urea solution injection device 23 and configured to supply the engine cooling water W to the urea solution injection device 23, and a seventh piping 38 connected from the urea solution injection device 23 to the fifth piping and configured to return the engine cooling water W from the urea solution injection device 23 to the engine main body 11. In the meantime, the first piping 31 to the seventh piping are shown with solid lines in FIG. 1.

Under opening and closing control of the flow control valve 33, the supply of the engine cooling water W to the heating pipe 34 is controlled to manage a temperature Tu of the urea solution U stored in the urea solution tank 21. To this end, a urea solution injection control unit (DCU) (control device) 41 configured to manage and control the urea solution supply system 20 and the system 30 for managing a temperature of a urea solution is provided.

The urea solution injection control unit 41 is configured to control the urea solution tank 21, the urea solution supply device 22, the urea solution injection device 23 and the like by signals from an entire control device (ECM) referred to as an engine control module configured to control the entire engine 10 and is also configured to control the flow control valve 33 by receiving a signal from a temperature sensor 42 provided for the urea solution tank 21 and configured to detect the temperature Tu of the urea solution U stored in the urea solution tank 21.

Also, when an abnormality (failure) occurs in any one of the urea solution tank 21, the urea solution supply device 22 and the urea solution injection device 23, the urea solution injection control unit 41 receives and transmits abnormality information to the entire control device 40, and the entire control device 40 provides a driver with the abnormality information by turning on a lamp arranged at a driver seat of a vehicle or the like and configured to display the abnormality information.

As shown in FIG. 1, the urea solution injection control unit 41 is configured separately from the entire control device 40 and they are interconnected by a control signal line. However, the urea solution injection control unit may be incorporated into the entire control device 40, which configure one system control device as a whole.

The urea solution injection control unit 41 is configured to change a valve-open time ratio ra of the flow control valve 33, to regulate a flow rate of the engine cooling water W to be supplied to the heating pipe 34 of the urea solution tank 21 and to control and manage the temperature Tu of the stored urea solution U for a preset constant time period (unit control time period) Rt such as 45 minutes in accordance with the temperature Tu of the urea solution U stored in the urea solution tank 21. In the meantime, the flow control valve 33 may be configured by a flow regulation valve and a valve opening degree upon opening of the flow regulation valve may be controlled to regulate the flow rate of the engine cooling water W. However, the configuration where the flow control valve 33 is configured by the opening and closing valve and an opening time period and a closing time period of the valve are controlled is preferable because it is possible to easily regulate the flow rate.

In the present invention, as shown in FIG. 2, a first temperature Tu1 is set to a temperature within a temperature range of −11° C. to 0° C., preferably 0° C. (0° C. in FIG. 2), a second temperature Tu2 is set to a temperature within a temperature range of 1° C. to 2.5° C., preferably 2° C. (2° C. in FIG. 2), and a third temperature Tu3 is set to a temperature within a temperature range of 15° C. to 20° C., preferably 20° C. (20° C. in FIG. 2). Also, regarding the valve-open time ratio ra, which indicates a ratio of a valve opening time period Ra to the preset constant time period Rt of the flow control valve 33, a preset set ratio rac is set to a time ratio within a range of 40% to 60%, preferably 50% (50% in FIG. 2).

A temperature range equal to or lower than the first temperature Tu1 is a temperature range in which the thawing of the urea solution has priority, and the melting point is −11° C., which is the lowest temperature, at a urea concentration of 32.5%. Therefore, considering this situation, the lower limit is set to −11° C. Also, when the urea concentration is 0%, i.e., when the solution contains only water, the melting point is 0° C. Therefore, the upper limit is set to 0° C. When the temperature exceeds 0° C., since the urea solution U around the temperature sensor 42 is securely melted, it is possible to precisely determine the urea concentration.

In a temperature range from the first temperature Tu1 to the second temperature Tu2, the priority on the thawing of the urea solution U decreases and the priority on suppression of air bubble formation caused by an increase in the temperature of the urea solution U increases. For this reason, as the temperature Tu of the urea solution U increases from the first temperature Tu1 to the second temperature Tu2, it is necessary to shift the valve-open time ratio ra from 100% to the set ratio. However, considering the control of the flow control valve 33, it is preferably to gradually reduce the flow rate, instead of reducing the flow rate at once. Therefore, the lower limit and the upper limit of the second temperature Tu2 are set to 1° C. and 2.5° C., respectively.

In a temperature range from the second temperature Tu2 to the third temperature Tu3, the air bubble formation is suppressed as much as possible while securing the thawing property of the entire urea solution tank 21. To this end, the valve-open time ratio ra is gently changed. When the temperature Tu of the urea solution U becomes 20° C. or higher, a detection value of a urea concentration sensor (not shown) tends to be lower than an actual concentration. Therefore, the third temperature Tu3 is provided as a temperature at which the increase in the temperature of the urea solution U is to stop, and the upper limit of the third temperature is set to 20° C. In the meantime, the lower limit is set to 15° C.

Herein, the valve-open time ratio ra of the flow control valve 33 is more specifically described. The valve-open time ratio is indicated by a percentage of a value (correction coefficient, which also applies to a correction coefficient shown on a vertical axis of FIG. 2) calculated by setting, as a denominator, a preset unit control time period (one cycle: for example, 45 minutes) Rt and as a numerator, the valve opening time period Ra in which the flow control valve 33 is opened for the unit control time period Rt. That is, the valve opening time period Ra=(unit control time period Rt×time ratio ra×0.01).

For example, when the valve-open time ratio ra of the flow control valve 33 is 100%, the flow control valve 33 is opened for the entire time period of the unit control time period Rt, when the valve-open time ratio ra is 50%, the flow control valve 33 is opened for a time period $R_{50}$, which is 50% of the unit control time period Rt, and when the valve-open time ratio ra is 0%, the flow control valve 33 is closed for the entire time period of the unit control time period Rt. That is, when the unit control time period Rt is 45 minutes, the time period $R_{50}$ is 22.5 minutes (=45 minutes× 50×0.01).

The urea solution injection control unit 41 is configured to control the flow control valve 33. The flow control valve 33 is configured to regulate the flow rate of the engine cooling water (heating medium) W that is to be supplied to the urea solution tank 21. In the control, the urea solution injection control unit is configured to perform control of setting the valve-open time ratio ra of the flow control valve 33 to 100% so as to make the flow control valve 33 continuously open when the temperature Tu of the urea solution U in the urea solution tank 21 is equal to or lower than the preset first temperature Tu1, setting the valve-open time ratio ra of the flow control valve 33 to the preset set ratio rac when the temperature Tu of the urea solution U in the urea solution tank 21 is the preset second temperature Tu2 and setting the valve-open time ratio ra of the flow control valve 33 to 0% so as to make the flow control valve 33 continuously close when the temperature Tu of the urea solution U in the urea solution tank 21 is equal to or higher than the preset third temperature Tu3.

Also, the urea solution injection control unit is configured to perform control of setting the valve-open time ratio ra of the flow control valve 33 to a linearly interpolated time ratio between 100% and the set ratio rac when the temperature Tu of the urea solution U in the urea solution tank 21 is between the first temperature Tu1 and the second temperature Tu2, and setting the valve-open time ratio ra of the flow control valve 33 to a linearly interpolated time ratio between the set ratio and 0% when the temperature Tu of the urea solution U in the urea solution tank 21 is between the second temperature Tu2 and the third temperature Tu3.

That is, when the temperature Tu of the urea solution U in the urea solution tank 21 is between the first temperature Tu1 and the second temperature Tu2, the flow control valve 33 is controlled to be opened with the valve-open time ratio ra, which is a value on a first line A indicating the valve-open time ratio ra on the vertical axis with respect to the temperature Tu of the urea solution on the horizontal axis, as shown in FIG. 2. Also, when the temperature Tu of the urea solution U is between the second temperature Tu2 and the third temperature Tu3, the flow control valve 33 is controlled to be opened with the valve-open time ratio ra, which is a value on a second line B indicating the valve-open time ratio ra on the vertical axis with respect to the temperature Tu of the urea solution on the horizontal axis, as shown in FIG. 2.

According to the above configuration, by the flow regulation of the engine cooling water W, it is possible to suppress the air bubble formation in the urea solution U, which is caused by the increase in the temperature of the urea solution U, while securing the thawing property of the urea solution U in the urea solution tank 21, and to accurately determine a concentration of urea (quality) included in the urea solution U. Also, the first temperature Tu1, the second temperature Tu2, the third temperature Tu3 and the set ratio rac are set to the above-described values, so that it is possible to more effectively manage the temperature state of the urea solution U to a state where the urea solution is thawed and the urea concentration can be precisely determined.

Subsequently, a method for a temperature of a urea solution in accordance with an illustrative embodiment of the present invention is described. The method for a temperature of a urea solution is a method for managing a temperature of the urea solution U including thawing or keeping warm the urea solution U stored in the urea solution tank 21, which is configured to store therein the urea solution U to be used as a reducing agent for NOx purification treatment in the exhaust gas G of the engine 10, by flowing the engine cooling water (heating medium) W to pass through the urea solution tank 21, and regulating a flow rate of the engine cooling water W to be supplied to the urea solution tank 21 by the flow control valve 33.

When the temperature Tu of the urea solution U of the urea solution tank 21 is equal to or lower than the preset first temperature Tu1, the flow control valve 33 is continuously opened with the valve-open time ratio ra being set to 100%, when the temperature Tu of the urea solution U of the urea solution tank 21 is the preset second temperature Tu2, the valve-open time ratio ra of the flow control valve 33 is set to the preset set ratio rac, and when the temperature Tu of the urea solution U of the urea solution tank 21 is equal to or higher than the preset third temperature Tu3, the flow control valve 33 is continuously closed with the valve-open time ratio ra being set to 0%.

Also, when the temperature Tu of the urea solution U of the urea solution tank 21 is between the first temperature Tu1 and the second temperature Tu2, the valve-open time ratio ra of the flow control valve 33 is set to a linearly interpolated time ratio between 100% and the set ratio rac, and when the temperature Tu of the urea solution U of the urea solution tank 21 is between the second temperature Tu2 and the third temperature Tu3, the valve-open time ratio ra of the flow control valve 33 is set to a linearly interpolated time ratio between the set ratio rac and 0%.

Therefore, according to the system 30 for managing a temperature of a urea solution and the method for a temperature of a urea solution having the above-described configuration, the flow regulation of the engine cooling water (heating medium) W is performed by the opening and closing control of the flow control valve 33 configured by the relatively simple opening and closing valve. Thereby, it is possible to suppress the air bubble formation in the urea solution U caused due to an increase in the temperature of the urea solution U while securing the thawing property of the urea solution U stored in the urea solution tank 21 and used as a reducing agent for NOx purification treatment in the exhaust gas G of the engine (internal combustion engine) 10, to accurately determine the concentration of urea (quality) included in the urea solution U and to reduce NOx by precisely supplying a proper amount of the urea solution U.

REFERENCE SIGNS LIST

10: engine (internal combustion engine)
11: engine main body
12: intake passage
13: exhaust passage
14: exhaust gas purification device
14a: oxidation catalyst
14b: filter for PM trap
14c: urea selective reduction-type catalytic device (urea SCR device)
20: urea solution supply system
21: urea solution tank
22: urea solution supply device
23: urea solution injection device
30: system for managing a temperature of a urea solution
33: flow control valve
34: heating pipe
40: entire control device (ECU)
41: urea solution injection control unit (control device)
42: temperature sensor
Tu1: preset first temperature
Tu2: preset second temperature
Tu3: preset third temperature
G: exhaust gas
Gc: purification-treated exhaust gas
U: urea solution
W: engine cooling water (heating medium)

The invention claimed is:

1. A system for managing a temperature of a urea solution configured to thaw or keep warm a urea solution stored in a urea solution tank by flowing a heating medium to pass through the urea solution tank, the urea solution tank storing the urea solution to be used as a reducing agent for NOx purification treatment in an exhaust gas of an internal combustion engine, the system comprising:
a flow control valve configured to regulate a flow rate of the heating medium to be supplied to the urea solution tank, wherein the heating medium is engine-cooling water; and
a control device which opens the flow control valve based on a set valve-open time ratio;
wherein the control device sets the valve-open time ratio by:
setting a valve-open time ratio of the flow control valve to 100% so as to make the flow control valve continuously open when a temperature of the urea solution in the urea solution tank is equal to or lower than a preset first temperature;
setting the valve-open time ratio of the flow control valve to a preset set ratio when the temperature of the urea solution in the urea solution tank is a preset second temperature;
setting the valve-open time ratio of the flow control valve to 0% so as to make the flow control valve continuously close when the temperature of the urea solution in the urea solution tank is equal to or higher than a preset third temperature;
setting the valve-open time ratio of the flow control valve to a linearly interpolated time ratio between 100% and the set ratio when the temperature of the urea solution in the urea solution tank is between the first temperature and the second temperature; and
setting the valve-open time ratio of the flow control valve to a linearly interpolated time ratio between the set ratio and 0% when the temperature of the urea solution in the urea solution tank is between the second temperature and the third temperature,
wherein the first temperature is set to be within a temperature range of −11° C. to 0° C., the second temperature is set to be within a temperature range of 1° C. to 2.5° C., the third temperature is set to be within a temperature range of 15° C. to 20° C. and the set ratio is set to be within a range of 40% to 60%.

2. A method for managing a temperature of a urea solution, the method comprising:
thawing or keeping warm a urea solution stored in a urea solution tank by flowing a heating medium to pass through the urea solution tank, the urea solution tank storing the urea solution to be used as a reducing agent for NOx purification treatment in an exhaust gas of an internal combustion engine, wherein the heating medium is engine-cooling water; and
regulating a flow rate of the heating medium to be supplied to the urea solution tank by a flow control valve,
wherein the method comprises performing control of:
setting a valve-open time ratio of the flow control valve to 100% so as to make the flow control valve continuously open when a temperature of the urea solution in the urea solution tank is equal to or lower than a preset first temperature;
setting the valve-open time ratio of the flow control valve to a preset set ratio when the temperature of the urea solution in the urea solution tank is a preset second temperature;
setting the valve-open time ratio of the flow control valve to 0% so as to make the flow control valve continuously close when the temperature of the urea solution in the urea solution tank is equal to or higher than a preset third temperature;
setting the valve-open time ratio of the flow control valve to a linearly interpolated time ratio between 100% and the set ratio when the temperature of the urea solution in the urea solution tank is between the first temperature and the second temperature; and
setting the valve-open time ratio of the flow control valve to a linearly interpolated time ratio between the set ratio and 0% when the temperature of the urea solution in the urea solution tank is between the second temperature and the third temperature,
wherein the first temperature is set to be within a temperature range of −11° C. to 0° C., the second temperature is set to be within a temperature range of 1° C. to 2.5° C., the third temperature is set to be within a temperature range of 15° C. to 20° C. and the set ratio is set to be within a range of 40% to 60%.

3. A system for managing a temperature of a urea solution configured to thaw or keep warm a urea solution stored in a urea solution tank by flowing a heating medium to pass through the urea solution tank, the urea solution tank storing the urea solution to be used as a reducing agent for NOx purification treatment in an exhaust gas of an internal combustion engine, the system comprising:
a flow control valve configured to regulate a flow rate of the heating medium to be supplied to the urea solution tank; and
a control device which opens the flow control valve based on a set valve-open time ratio;

wherein the control device sets the valve-open time ratio by:
  setting a valve-open time ratio of the flow control valve to 100% so as to make the flow control valve continuously open when a temperature of the urea solution in the urea solution tank is equal to or lower than a preset first temperature, wherein the preset first temperature is based on the melting point of water;
  setting the valve-open time ratio of the flow control valve to a preset set ratio when the temperature of the urea solution in the urea solution tank is a preset second temperature;
  setting the valve-open time ratio of the flow control valve to 0% so as to make the flow control valve continuously close when the temperature of the urea solution in the urea solution tank is equal to or higher than a preset third temperature;
  setting the valve-open time ratio of the flow control valve to a linearly interpolated time ratio between 100% and the set ratio when the temperature of the urea solution in the urea solution tank is between the first temperature and the second temperature; and
  setting the valve-open time ratio of the flow control valve to a linearly interpolated time ratio between the set ratio and 0% when the temperature of the urea solution in the urea solution tank is between the second temperature and the third temperature,
wherein the rate of change in the valve-open time ratio between the second temperature and the third temperature is smaller than the rate of change in the valve-open time ratio between the first temperature and the second temperature.

* * * * *